(12) United States Patent
McCann et al.

(10) Patent No.: US 6,994,191 B2
(45) Date of Patent: Feb. 7, 2006

(54) PNEUMATICALLY ACTUATED PARKING BRAKE

(75) Inventors: Denis John McCann, Rochester Hills, MI (US); Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/701,354

(22) Filed: Nov. 4, 2003

(65) Prior Publication Data

US 2005/0092563 A1 May 5, 2005

(51) Int. Cl.
*F16D 65/24* (2006.01)

(52) U.S. Cl. .................. 188/170; 188/265; 188/72.7
(58) Field of Classification Search ............. 188/166, 188/168, 167, 170, 265, 72.7; 303/89
See application file for complete search history.

(56) References Cited

U.S. PATENT DOCUMENTS

| | | | | | |
|---|---|---|---|---|---|
| 4,007,815 | A | * | 2/1977 | Acre .......................... | 188/265 |
| 4,273,388 | A | * | 6/1981 | Muller ........................ | 303/89 |
| 4,746,171 | A | * | 5/1988 | Engle ......................... | 303/13 |
| 4,978,178 | A | * | 12/1990 | Engle ......................... | 303/13 |
| 5,558,410 | A | * | 9/1996 | Kanjo et al. ................ | 303/71 |
| 5,558,411 | A | * | 9/1996 | Kanjo et al. ................ | 303/71 |
| 6,305,511 | B1 | * | 10/2001 | McCann et al. ............ | 188/265 |
| 6,491,352 | B2 | * | 12/2002 | Engle .......................... | 303/8 |
| 6,578,679 | B2 | * | 6/2003 | Hill et al. .................. | 188/170 |

FOREIGN PATENT DOCUMENTS

| | | |
|---|---|---|
| EP | 0 207 275 | 1/1987 |
| EP | 0 891 908 | 1/1999 |
| WO | WO 99/48738 | 9/1999 |
| WO | WO 01/66376 | 9/2001 |

OTHER PUBLICATIONS

European Search Report, Mar. 15, 2005.

* cited by examiner

*Primary Examiner*—Devon C. Kramer
(74) *Attorney, Agent, or Firm*—Carlson, Gaskey & Olds

(57) ABSTRACT

A vehicle parking brake system pneumatically actuates an air cylinder to mechanically lock a wheel brake in an applied position in response to a parking demand request. The air cylinder includes an extendable shaft that supports a lock member. When a parking demand request is initiated by moving a hand control, an air chamber is pressurized with air from a parking reservoir via a valve assembly to apply the wheel brake. Air pressure is released from the air cylinder and the lock member is moved into engagement with a brake component to lock the wheel brake in the applied condition. The wheel brake remains locked even if pressure is released from the air chamber. When a release command is initiated, the air cylinder is pressurized and the lock member is moved out of engagement with the brake component.

25 Claims, 12 Drawing Sheets

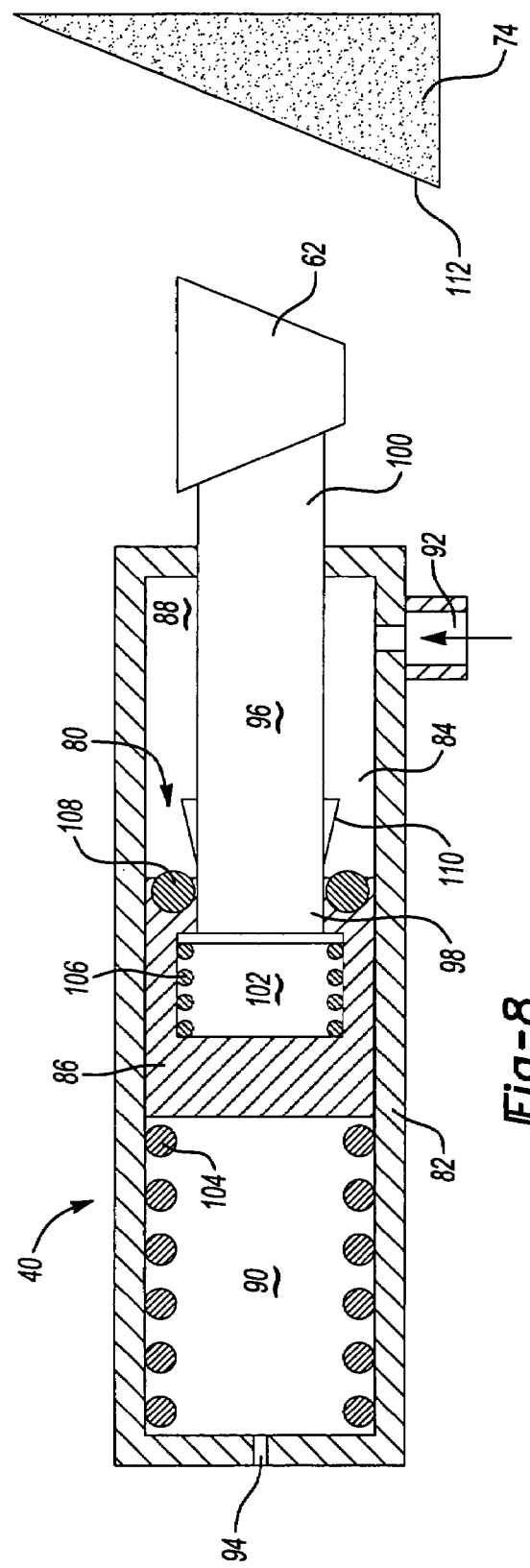

PNEUMATICALLY ACTUATED PARKING BRAKE

BACKGROUND OF THE INVENTION

The subject invention relates to a parking brake system for a vehicle including a pneumatically controlled latching cylinder that mechanically locks a service brake in a parked condition.

Traditionally, heavy commercial vehicles utilize spring actuators to provide the energy needed for parking. Typically, a hand operated lever or handle is moved by an operator into a park position, which causes the spring actuators to be applied. A valve that works on an inverse air principle controls the actuators. The valve releases air pressure in response to a parking command, to allow the spring force of the spring actuators at each wheel to apply the brake. During vehicle operation, i.e. under normal driving conditions when parking is not required, the air pressure in the system is sufficient to overcome the spring force in the spring actuators allowing free rotation of the wheel.

One disadvantage with this conventional parking system is that the spring actuators are bulky, heavy, and expensive. This system is especially disadvantageous on front steering axles where packaging space is at a premium. In certain axle configurations, it is not possible to install the spring actuators because there is simply not enough room.

Thus, there is a need for a parking brake system that eliminates the spring actuators while still providing a pneumatically controlled and mechanically lockable park brake.

SUMMARY OF THE INVENTION

A parking brake system for a vehicle includes a pneumatically controlled air cylinder that mechanically locks a vehicle brake in an applied position in response to a parking demand request. A parking demand component, such as a hand control for example, is moved to a park position, which generates a pneumatic control signal that causes the air cylinder to move to a locked position. Air from a parking reservoir is supplied to an air chamber via a valve assembly. Once the air chamber is pressurized, the vehicle brake is applied. Air pressure is removed from the air cylinder causing a locking component mounted within the air cylinder to move to a locked position, which holds the vehicle brake in the applied position, thus achieving a park condition. The air cylinder holds the brake in the applied position even if air pressure is released from the air chamber. When a release command is initiated, the air cylinder is pressurized and the locking component is moved to an unlocked position.

In one disclosed embodiment, the air cylinder includes a cylinder housing defining an interior cavity and a piston mounted within the cavity to divide the cavity into first and second chambers. An inlet port is formed within the housing to provide fluid communication with the first chamber. An extension shaft is operably coupled to the piston at one end and includes a wedge shaped member at an opposite end. The wedge shaped member is selectively moved into engagement with a brake component. A first resilient member cooperates with the piston and is mounted within the second chamber. A second resilient member is mounted within a cavity formed within the piston. The piston supports a plurality of balls. The balls are selectively moved into engagement with a ramped surface on the shaft to achieve the locked position.

The air cylinder operates in the following manner. During normal vehicle operation, the inlet port provides air pressure to the first chamber and holds the piston in place against the spring force of the first resilient member. When a parking demand request is received, air is released from the first chamber and the first resilient member pushes the piston and shaft toward the brake component. The wedge shaped member engages the brake component preventing further movement of the shaft. The first resilient member continues to push against the piston to compress the second resilient member, which results in movement of the piston relative to the shaft. This forces the balls into engagement with the ramped surface on the shaft to achieve the locked position. This configuration provides sufficient force to hold the vehicle brake in the applied position in the event that air pressure is released from the air chamber.

In one disclosed embodiment, the valve assembly includes a two-way valve, which is positioned between the air chamber and a service braking control mechanism, and also includes an inversion valve, which is positioned between the two-way valve and the hand control. During normal vehicle driving operation, an air line to the air cylinder is pressurized and the air chamber is not pressurized, i.e. the brakes are released. When the hand control is moved to the park position, air pressure is released from the air line to the air cylinder and is lowered in an air line between the inversion valve and the hand control. This generates a positive pressure output from the inversion valve that is used to pressurize the air chamber via the two-way valve, resulting in the vehicle brake being applied. When the air pressure in the air line to the air cylinder is less than a predetermined pressure level, the air cylinder is moved to a locking position to hold the vehicle brake in the applied position.

When a release command is generated, the system is re-pressurized causing the air cylinder to move to the unlocked position. The inversion valve releases air from the air chamber. If the air cylinder should become trapped in the locked position, a pressure switch positioned adjacent to the inversion valve is used to generate a braking signal that is transmitted to a service brake controller. The service brake controller then applies the vehicle brake at full pressure via a service brake system to release the air cylinder.

The subject system provides a simple and effective method for using pneumatic control to mechanically lock a brake in a parked condition. The system eliminates the need for spring actuators and is easily incorporated into existing braking systems. These and other features of the present invention can be best understood from the following specification and drawings, the following of which is a brief description.

BRIEF DESCRIPTION OF THE DRAWINGS

FIG. 8 is a schematic cross-sectional view of a locking air cylinder in a retracted position.

DETAILED DESCRIPTION OF THE PREFERRED EMBODIMENT

Figure 1:
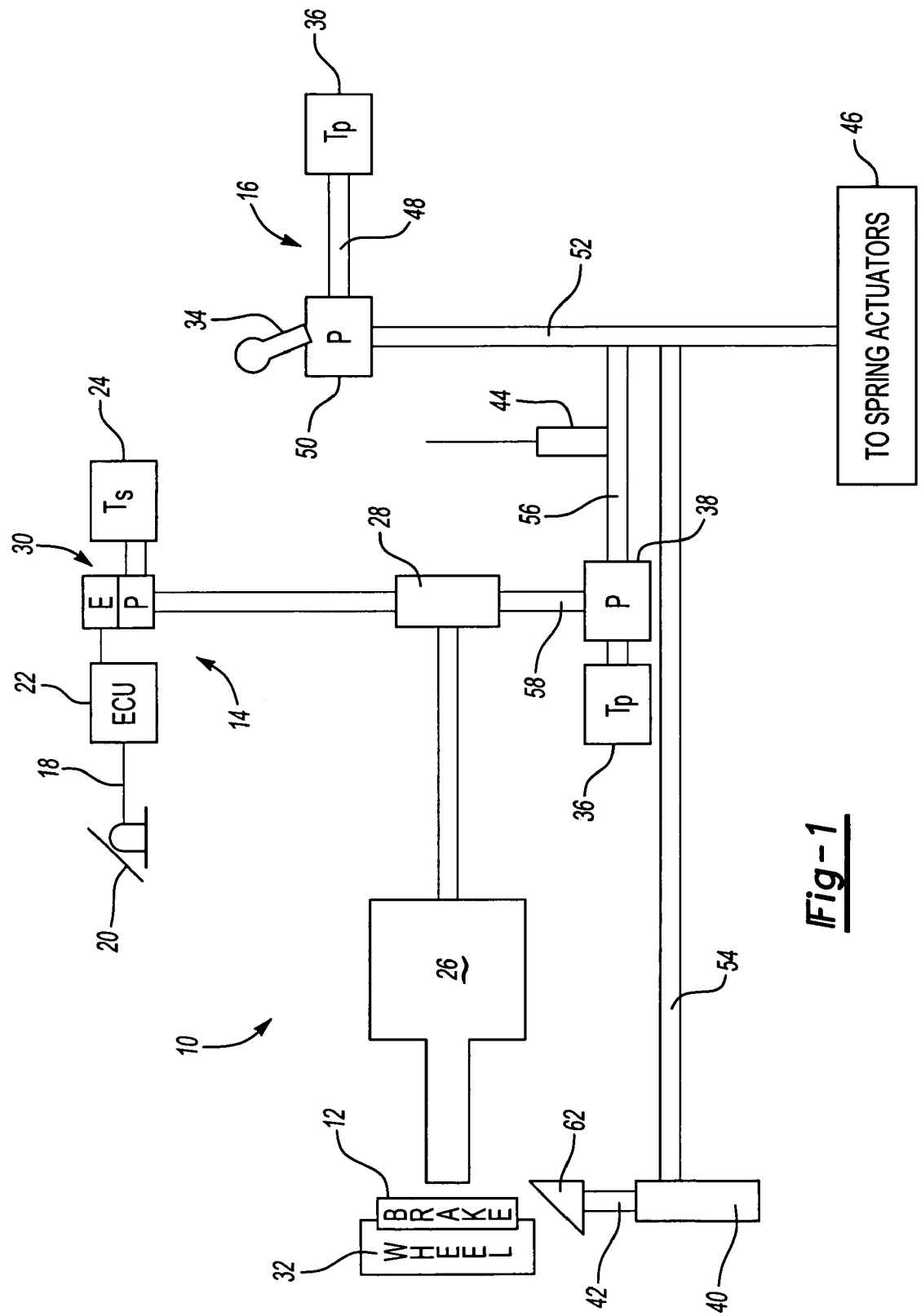
FIG. 1 is a schematic diagram of a vehicle braking system incorporating the subject invention.

A vehicle braking system 10 for a front brake assembly 12 is shown in FIG. 1. The front brake assembly includes a service brake system shown generally at 14 and a parking brake system shown generally at 16. The subject parking brake system 16 is especially useful for front axle assemblies on heavy-duty commercial vehicles, however, it should be understood that the parking brake system 16 could also be utilized in other axle configurations.

The service brake system 14 is preferably an electronic braking system (EBS) that is responsive to electronic control signals 18 generated by depressing a service brake actuator 20, such as a brake pedal. The electronic control signals 18 are communicated to an electronic control unit (ECU) module 22, which then issues a braking command. The ECU module 22 includes an electro-pneumatic valve 30, which is preferably integrated with the ECU module 22. In response to a braking demand front the main ECU module 22, the ECU module 22 sets the required pressure in the air chamber 26.

A service brake air reservoir or tank 24 provides pressurized air to a front air chamber 26 via the electro-pneumatic valve 30 and a two-way valve 28. Once the air chamber 26 is pressurized, the air chamber 26 actuates the brake assembly 12 to brake a vehicle wheel 32. The air chamber 26 includes a diaphragm, spring, and push rod assembly, and operates in a manner well-known in the art. Further, while only one air chamber 26 is shown in FIG. 1, it should be understood that each wheel 32 on an axle assembly includes a brake 12 and an associated air chamber 26 to actuate the brake 12.

The parking brake system 16 includes a hand control 34 that is manipulated by a vehicle operator. The hand control 34 is solely pneumatically based. In response to movement of the hand control 34, pressurized air from a parking brake air reservoir or tank 36 is communicated to the front air chamber 26 via an inversion valve 38 and the two-way valve 28 to apply the wheel brake 12. Movement of the hand control 34 also controls pressurization of an air cylinder 40 that includes a locking component 42, which holds the brake 12 in the applied position to achieve a park condition.

The hand control 34 is also used to release the locking component 42 to move out of a park condition. A pressure component 44 is utilized to ensure that the locking component 42 does not inadvertently become trapped in the locked position. The parking brake system 16 also actuates parking brake spring actuators 46 for brakes on a rear axle assembly (not shown) with air from the parking brake air reservoir 36 as is known. It should be understood that air for parking preferably comes from the parking brake air reservoir 36, however, the system could also be configured to draw air from any other vehicle reservoir, such as the service brake air reservoir 24, for example.

A plurality of air connection lines is used to fluidly connect the various components of the service 14 and parking 16 brake systems. A first line portion 48 extends from the parking brake air reservoir 36 to a control valve 50 controlled by the hand control 34. A second line portion 52 extends from the control valve 50 to the rear parking brake spring actuators 46. A third line portion 54 extends from the second line portion 52 to the air cylinder 40 and a fourth line portion 56 extends from the second line portion 52 to the inversion valve 38. Additional line portions are used to provide air to the air chambers 26, to connect to the electro-pneumatic valve 30, and to connect to the service brake air reservoir 24 as needed.

Figure 2:
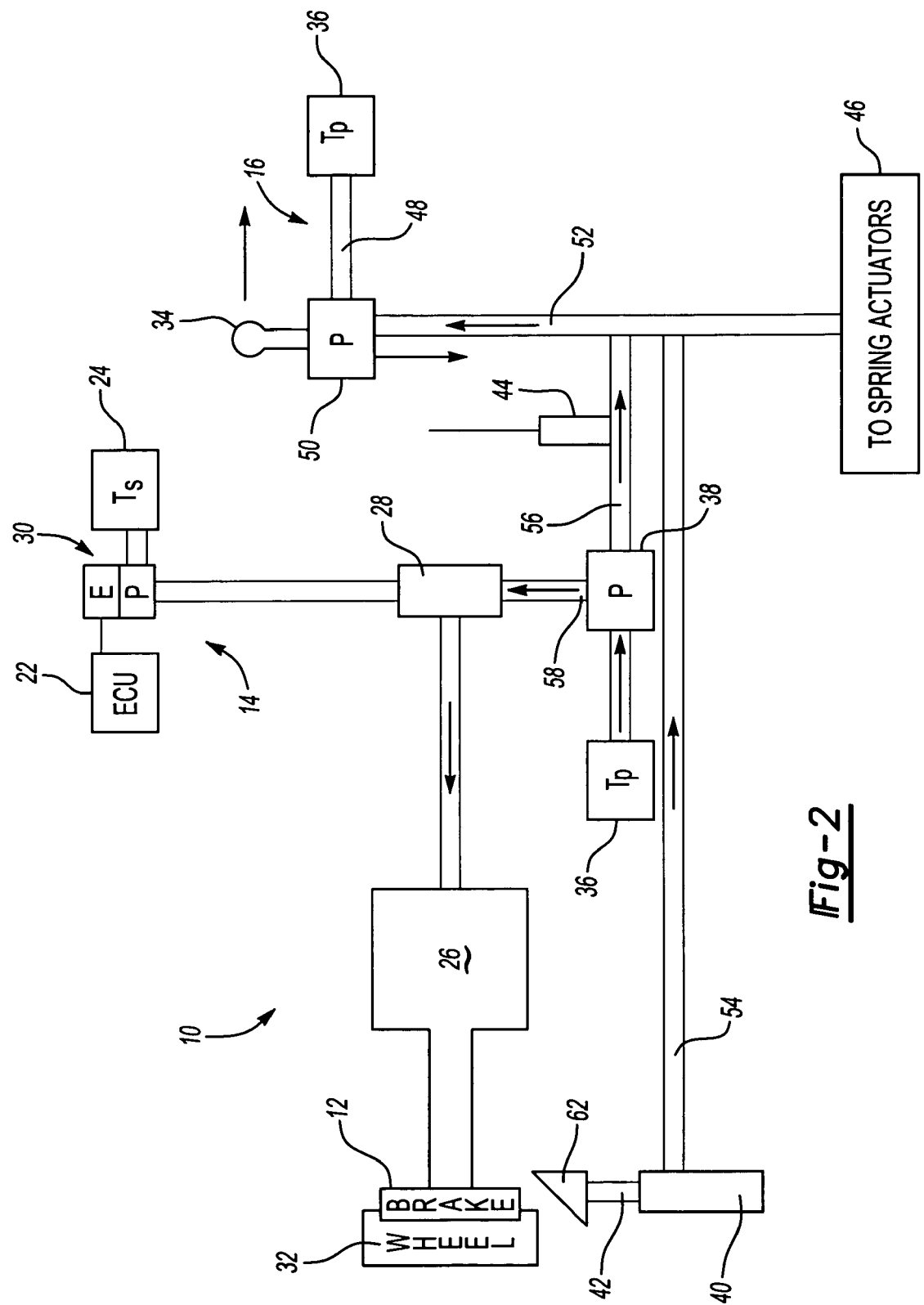
FIG. 2 is a schematic diagram of the system of FIG. 1 showing proportional control.

The parking brake system 16 also includes a proportional control feature that can be used in addition to supplement for service braking. As shown in FIG. 2, the hand control 34 can be actuated to provide this supplementary braking. When the hand control is moved, the air pressure in the line portion 52, 56 between the inversion valve 38 and the control valve 50 is lowered. Air pressure from the line portion 52, 54 between the control valve 50 and the air cylinder 40 is also lowered but sufficient pressure remains in the air cylinder line portion 54 to hold back the cylinder 40 and the locking component 42 in the unlocked condition.

The lowering pressure in the line portion 52, 56 between the inversion valve 38 and the control valve 50 generates a positive pressure output from the inversion valve 38 in an air connection 58 between the inversion valve 38 and the two-way valve 28. This causes the air chamber 26 to be pressurized via the two-way valve 28 with air from the parking brake air reservoir 36. When the air chamber 26 is pressurized, the brake 12 is applied, but because the air cylinder 40 is still sufficiently pressurized, the brake 12 is not locked in a park condition. Thus, proportional service braking is provided by the parking brake system 16 without locking the brake 12.

Figure 3:
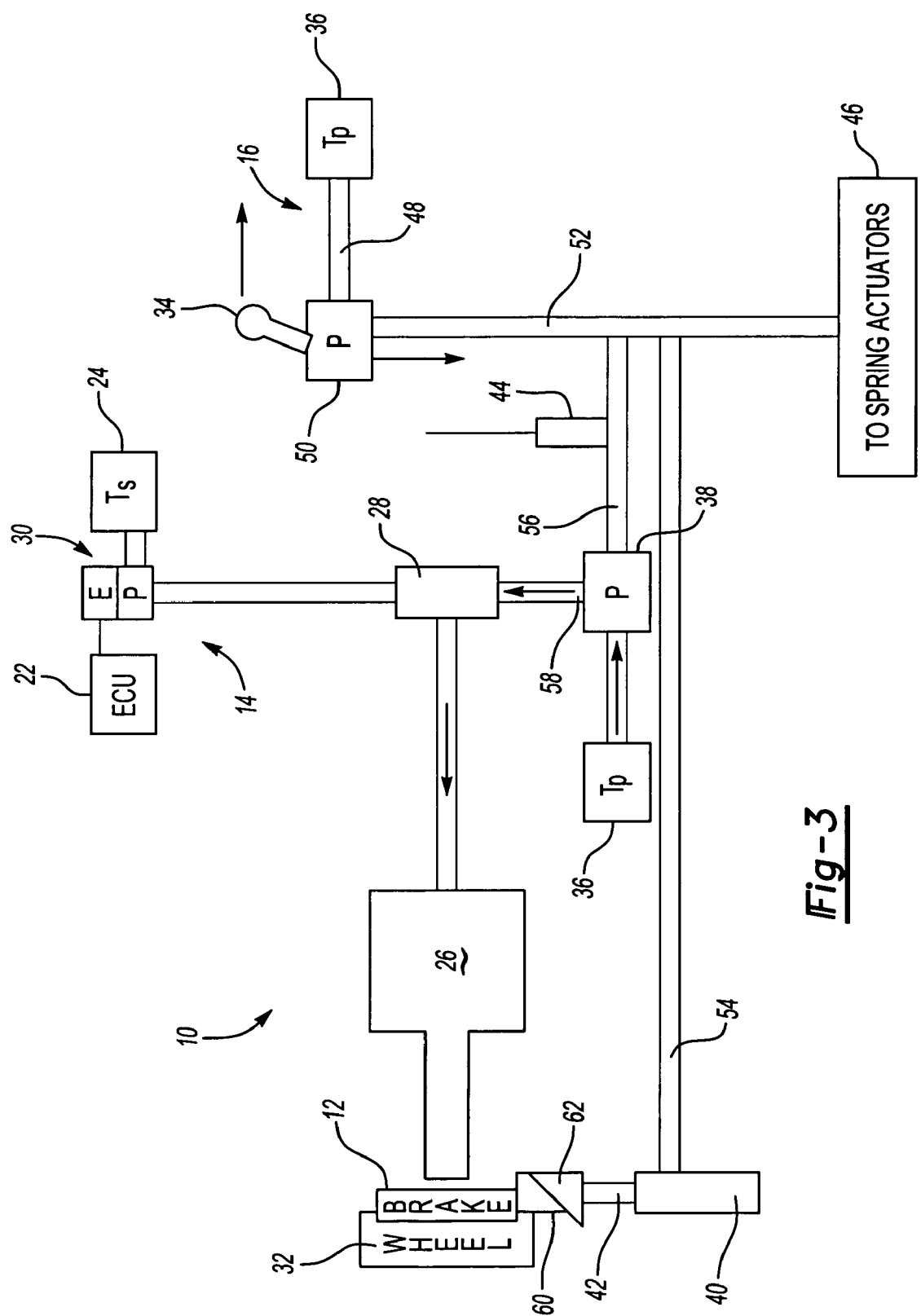
FIG. 3 is a schematic diagram of the system of FIG. 1 showing a park locking feature.

To mechanically lock the brake 12 in a park condition via pneumatic control, the hand control 34 is moved to a park position as shown in FIG. 3. The air chamber 26 is pressurized and the brake 12 is applied in a manner as discussed above with regard to the proportional braking. Air pressure is decreased in the connection line 52, 54 between the control valve 50 and the air cylinder 40 until the pressure falls below a predetermined pressure level. Preferably, the predetermined pressure level is generally little or no pressure in the line, i.e. less than 1.0 bar. This will be discussed in greater detail below.

Once the pressure is evacuated from the air cylinder 40, the locking component 42 is moved to the locked position. In the locked position, the locking component 42 engages a brake member 60 to hold the brake 12 in the applied position. The locking component 42 preferably includes a wedge member 62 that extends outwardly from the air cylinder 40 to engage the brake members 60 for the front wheels 32. If pressure falls in the air connection line to the front chambers 26, the brake 12 will remain mechanically locked due to the application of the air cylinder 40. The pressure also falls in the line 52 to the rear spring actuators 46 causing the spring force to lock the rear brakes in a park condition.

Figure 4:
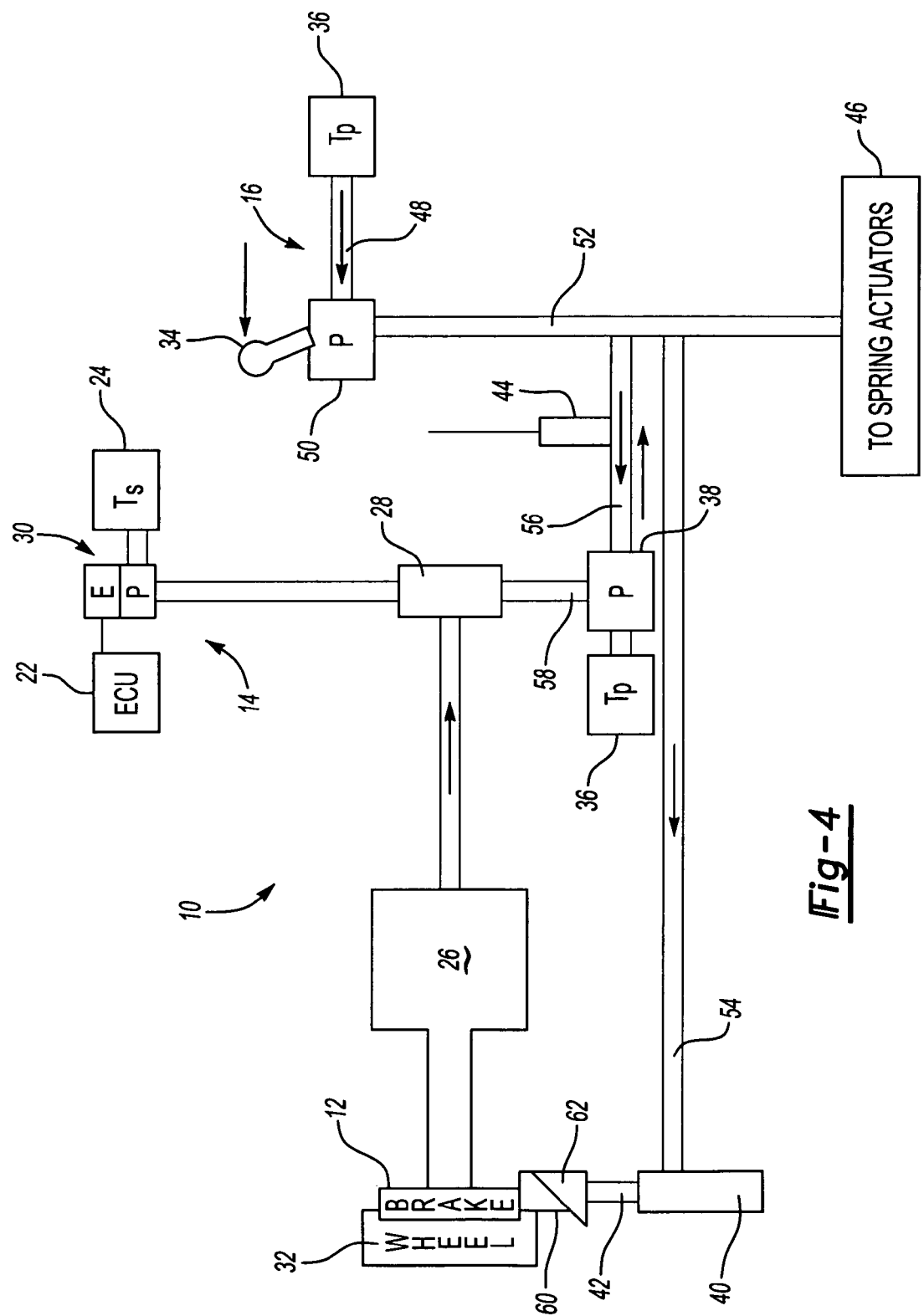
FIG. 4 is a schematic diagram of the system of FIG. 1 showing a park release mode.

FIG. 4 shows the parking release system configuration. The hand control 34 is moved to a release position and air from the parking brake air reservoir 36 pressurizes the lines 52, 54, 56 to the rear spring actuators 46, to the air cylinder 40, and to the inversion valve 38. This releases the rear spring actuators 46, which releases the rear brakes. The inversion valve 38 releases air from the front air chambers 26, which releases the front brakes 12. Once the air cylinder 40 is pressurized, the locking component 42 is disengaged from the brake member 60.

Figure 5:
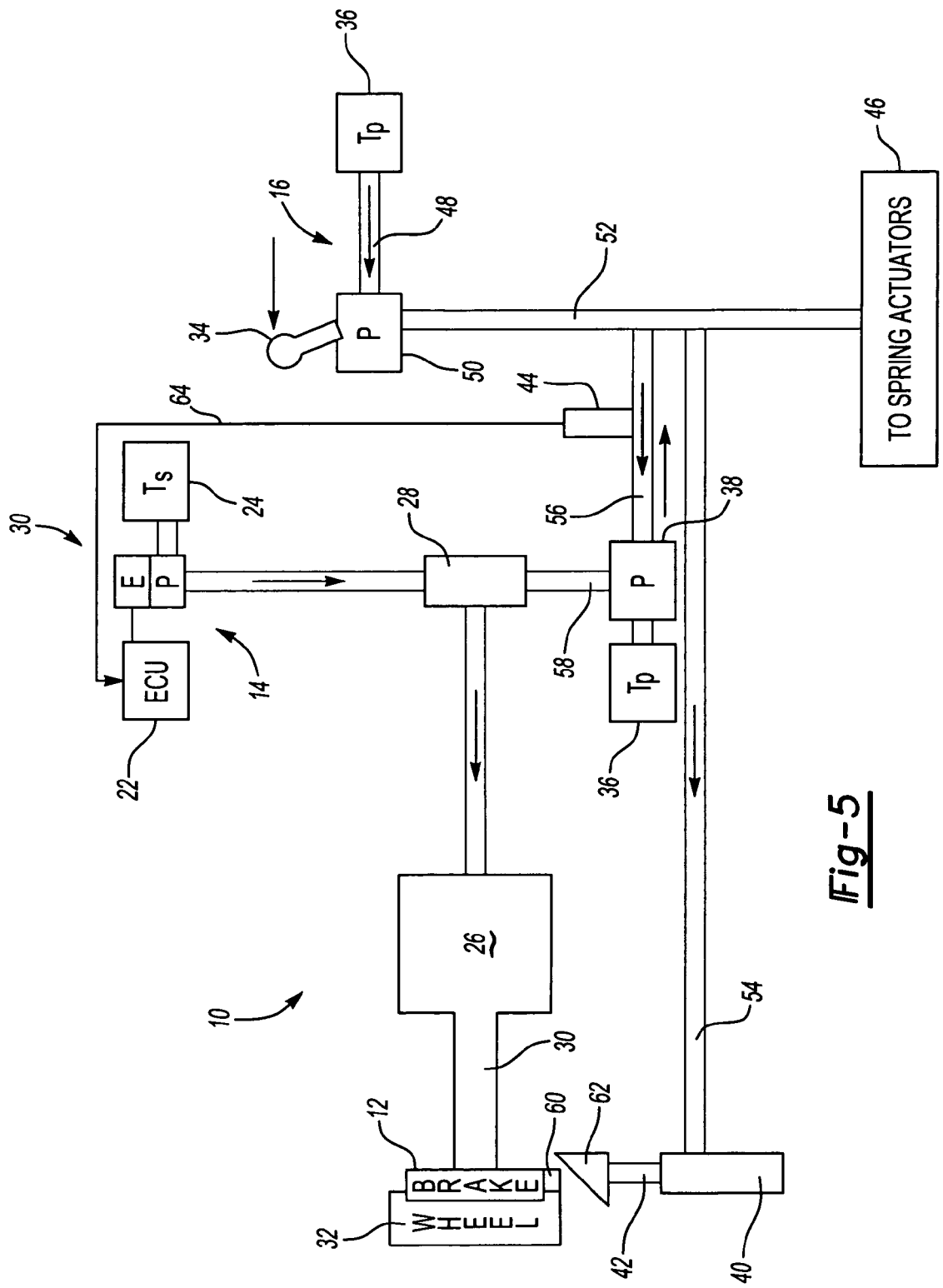
FIG. 5 is a schematic diagram of the system of FIG. 1 showing a locking release mode.

To ensure that the locking component 42 does not become trapped in the locked position, the pressure component 44 will operate to assist in the release of the locking component 42. As shown in FIG. 5, the pressure component 44 comprises a pressure switch 44 that is positioned between the rear spring actuators 46 and the inversion valve 38. When the hand control 34 is moved to the release position, the lines are pressurized as described above to release the rear spring actuators 46 and to pressurize the air cylinder 40. When the pressure switch 44 senses a predetermined pressure level, the pressure switch 44 is activated to send an electronic signal 64 to the service brake ECU module 22. Preferably, the predetermined pressure level is 6.0–8.0 bars, however, other pressure ranges could also be used. The ECU module 22 then pressurizes the front air chamber 26 to apply and release the front brake 12 with the service brake system 14. This will release the locking component 42 from engagement with the front brake 12. This procedure automatically occurs without requiring any intervention from the vehicle operator.

Optionally, pressure switch 44 could comprise a pressure sensor 44. In this embodiment, the ECU module 22 is programmed to apply and release the brakes 12 as pressure in line 56 exceeds a predetermined pressure level.

In either embodiment, the action to apply and release the brakes 12 for release of the locking component 42 should not occur during normal vehicle operation. To avoid this action when the vehicle is in motion and/or while the driver is braking using the hand control 34 in the proportional range, there is a zero vehicle speed condition that must be met before the brakes 12 can be applied and released. This ensures that the apply/release action is only associated with parking.

Figure 6:
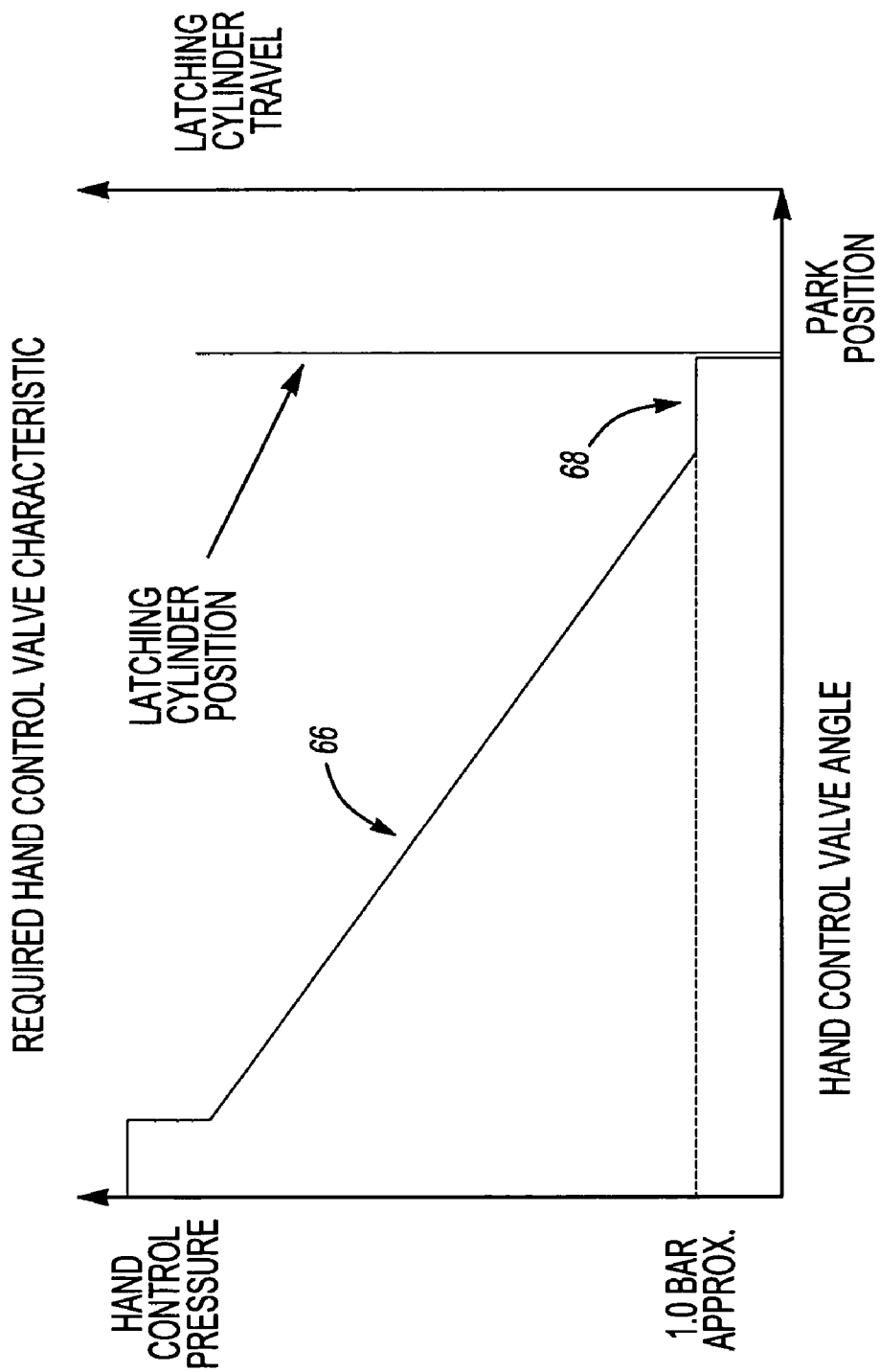
FIG. 6 is a graph showing hand control pressure verse hand control valve angle.

The required hand control valve 50 characteristic is shown in FIG. 6. FIG. 6 depicts hand control pressure versus hand control valve angle. As hand control pressure decreases, indicated generally by 66, the falling pressure provides the proportional braking discussed above. Once the pressure approaches 1.0 bar, the pressure approaches a constant portion or dead zone 68 prior to the hand control 34 being moved into the park position. This dead zone 68 prevents the air cylinder 40 from actuating the locking component 42 during the proportional hand control region. Once the pressure falls below 1.0 bar, the air cylinder 40 actuates the locking component 42, which is extended to engage and lock the brake member 60.

The inversion valve 38 preferably increases pressure to the front air chamber 26 as pressure to the rear spring actuators 46 is released. This causes the front and rear brakes 12 to be applied together in a proportional, modulated fashion. However, the inversion valve 38 could also be configured to simply switch when pressure in the line 56 falls below a predetermined level. If configured in this manner, as the pressure falls below 1.0 bar (as shown in FIG. 6), then the front brakes 12 would be applied and latched at the same time. When the inversion valve 38 switches, the inversion valve 38 connects the front air chambers 26 to the parking brake air reservoir 36. When pressure is re-introduced into line 56 on parking release, the inversion valve 38 switches back, releasing the pressure from the air chamber 26.

A schematic representation of the operation of the parking brake system 16 is shown in FIGS. 7A through 7D. The brake 12 includes a rotating brake disc 70 and a pair of brake pads 72. The chamber 26 actuates a pivoting brake operating member or shaft 74. The brake operating member 74 includes a cam 76 at one end that actuates a brake piston 78, which forces the pads 72 into engagement with the brake disc 70.

Figure 7A:
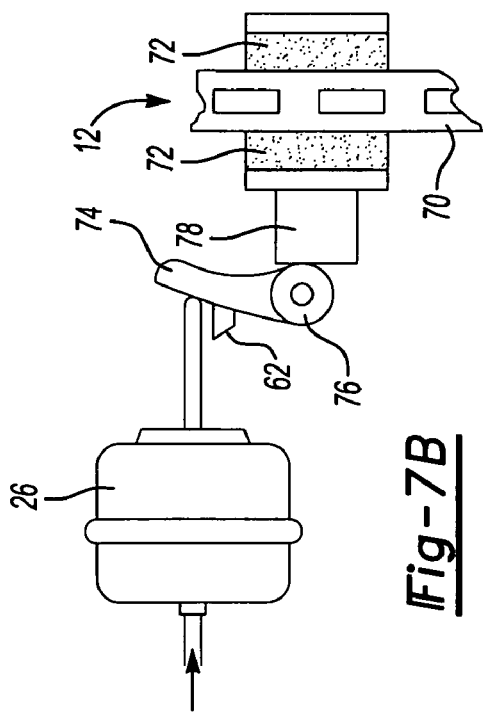
FIG. 7A is a schematic diagram of an air chamber and brake assembly in a non-applied or release condition.
Figure 7B:
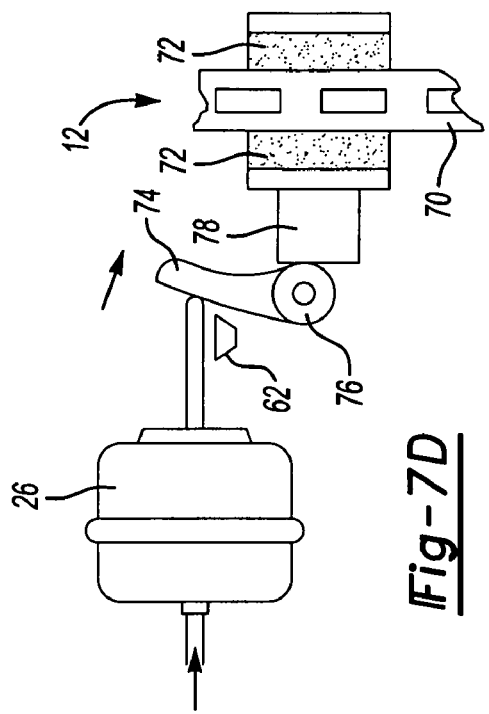
FIG. 7B is an air chamber and brake assembly of FIG. 7A in a park applied and locked condition.
Figure 7C:
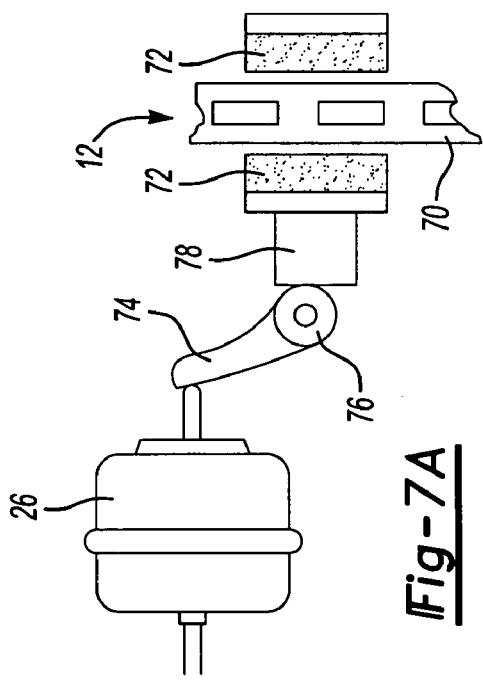
FIG. 7C is an air chamber and brake assembly of FIG. 7A in an air chamber exhausted and park lock condition.
Figure 7D:
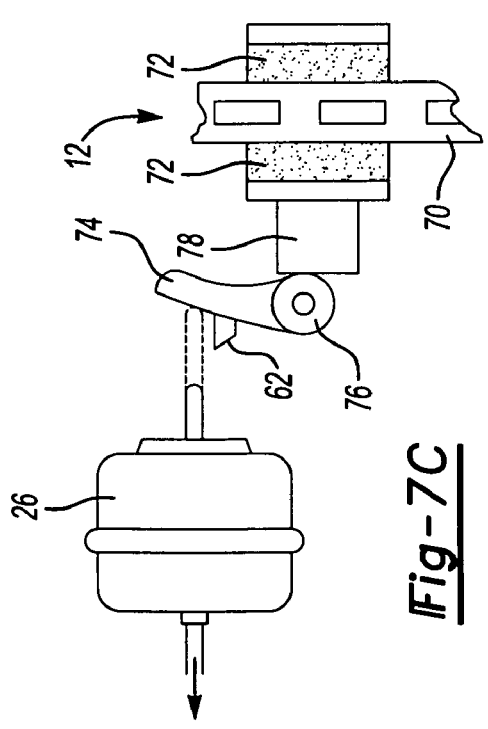
FIG. 7D is an air chamber and brake assembly of FIG. 7A in a park release and unlocked condition.

FIG. 7A shows the brake 12 in a released or non-applied position, with chamber 26 retracted. FIG. 7B shows the brake 12 in the park applied position, with the chamber 26 extended and the wedge member 62 engaging the brake operating member 74 to lock the brake 12 in the applied position. FIG. 7C shows that the brake 12 remains in park, should the air chamber 26 become exhausted through air leakage, due to the engagement between the wedge member 62 and the brake operating member 74. FIG. 7D shows the brake 12 being reapplied to release the wedge member 62 from engagement with the brake operating member 74, such as would occur in the situation described with regard to FIG. 5.

The air cylinder 40 extends the wedge member 62 from the cylinder 40 to block the back travel of the brake operating member 74. After the wedge member 62 is moved into place, should the air become exhausted through leakage from the air chamber 26, the wedge member 62 must be capable of holding back the reaction forces of the brake operating member 74. Due to the travel and design angle requirements and the size limitations on the air cylinder 40, a secondary locking mechanism 80 (a locking mechanism in addition to the wedge member 62) is required within the cylinder 40 to provide sufficient locking force.

Locking cylinders have been used in factory automation systems and vehicle braking systems. This type of cylinder typically is a double acting cylinder that includes a separate control port for the cylinder locking mechanism. A collect or claming ring mechanism is held off by a separate air control port. It is not feasible to use this type of configuration in the subject braking application. The cost and space limitations of the braking control system do not permit a second pneumatic or electrically controlled locking mechanism.

The subject invention utilizes a unique locking air cylinder that does not require a separate control port to actuate the locking mechanism. FIG. 8 shows the air cylinder 40 in a retracted position with the air connection 54 to the cylinder 40 being pressurized. The air cylinder 40 includes a cylinder housing 82 defining an internal cavity 84. A piston 86 is slidably received within the internal cavity 84 and divides the cavity 84 into first 88 and second 90 chambers. The air connection 54 supplies air to the first chamber 88 via an air supply port 92 formed within the cylinder housing 82. A vent port 94 is formed within the second chamber 90.

An extension shaft 96 includes a first end 98 that is operably coupled to the piston 86 and a second end 100 that supports the wedge member 62. The piston 86 defines an inner cavity 102. The first end 98 of the extension shaft 96 is received within the inner cavity 102. A main resilient spring member 104 is mounted within the second chamber 90. The main resilient spring member 104 reacts between the cylinder housing 82 and the piston 86. A secondary resilient spring member 106 is mounted within the inner cavity 102 of the piston 86. The secondary resilient spring member 106 reacts between the extension shaft 96 and the piston 86. A plurality of locking balls 108 is caged within the piston 86. A tapered disc locking ramp surface 110 is formed on or mounted on the extension shaft 96 near the first end 98. The locking balls 108 cooperate with the locking ramp surface 110 to provide the secondary or cylinder locking mechanism 80.

Figure 9:
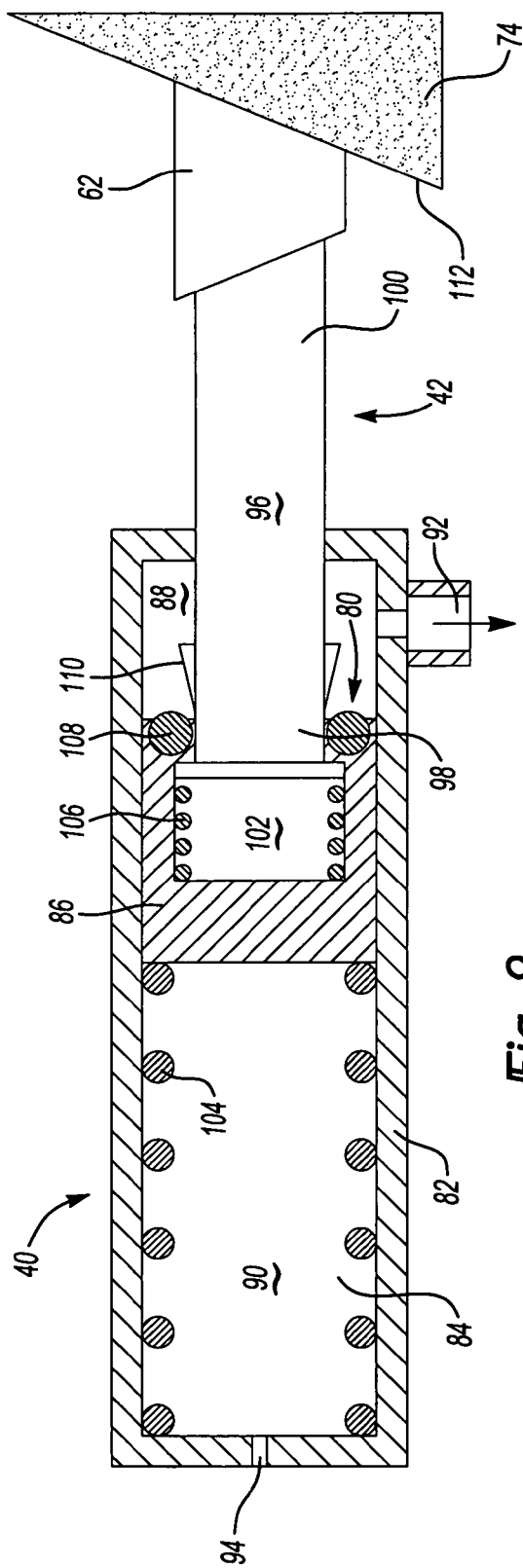
FIG. 9 shows the locking cylinder of FIG. 8 in an extended and unlocked position.

In FIG. 8, the cylinder 40 is shown in a retracted position with air pressure being supplied to the first chamber 88 via the air supply port 92. In FIG. 9, air is removed from the air supply port 92 and the main resilient spring member 104 is no longer held back by the piston 86. The main resilient spring member 104 moves the piston 86 toward the brake operating member 74. The piston 86 acts on the extension shaft 96 through the secondary resilient spring member 106. The stiffness of the secondary resilient spring member 106 should be greater than any friction forces that must be overcome in moving the extension shaft 96 as the shaft 96 is fully extended to contact the mating angled surface 112 of the brake operating member 74.

Figure 10:
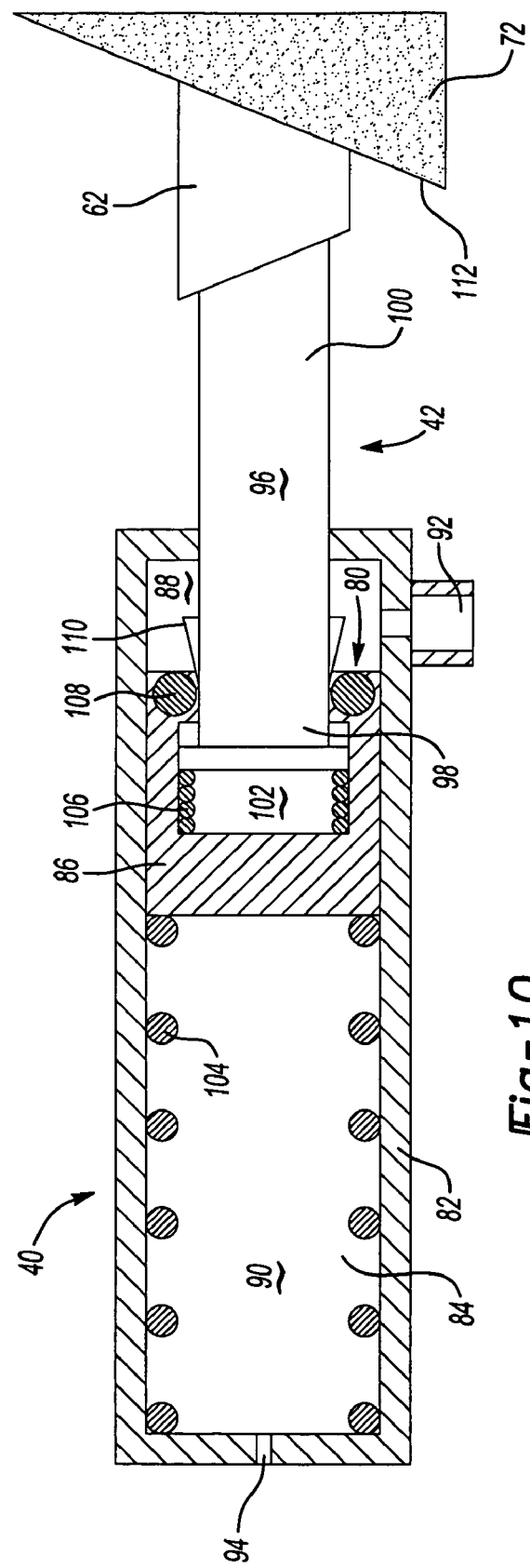
FIG. 10 shows the locking cylinder of FIG. 8 in an extended and locked position.

In FIG. 10 the extension shaft 96 is shown fully extended with the wedge member 62 in abutting engagement with the brake operating member 74. The extension shaft 96 is prohibited/constrained from further movement. The piston 86 continues to move to actuate the secondary locking mechanism 80. The piston 86 moves relative to the extension shaft 96 causing the piston 86 and shaft 96 to collapse together, further compressing the secondary resilient spring member 106. At this point, the force of the main resilient spring member 104 is greater than the force of the secondary resilient spring member 106. This relative motion between the shaft 96 and piston 86 only occurs once the extension shaft 96 is constrained by the abutment between the wedge member 62 and the brake operating member 74.

This relative motion also causes the secondary or cylinder locking effect to occur. The piston 86 pushes the locking balls 108 forward until they contact the angled surface of the locking ramp surface 110 on the extension shaft 96. The balls 108 become wedged between the locking ramp surface 110 and the walls of the cylinder housing 82. This wedging action generates a high locking force between the extension shaft 96 and cylinder housing 82. This locking force is much greater than the force generated by the main resilient spring member 104 alone. As a result, the extension shaft 96 is capable of holding back the reaction forces from the brake operating member 74.

Figure 11A:
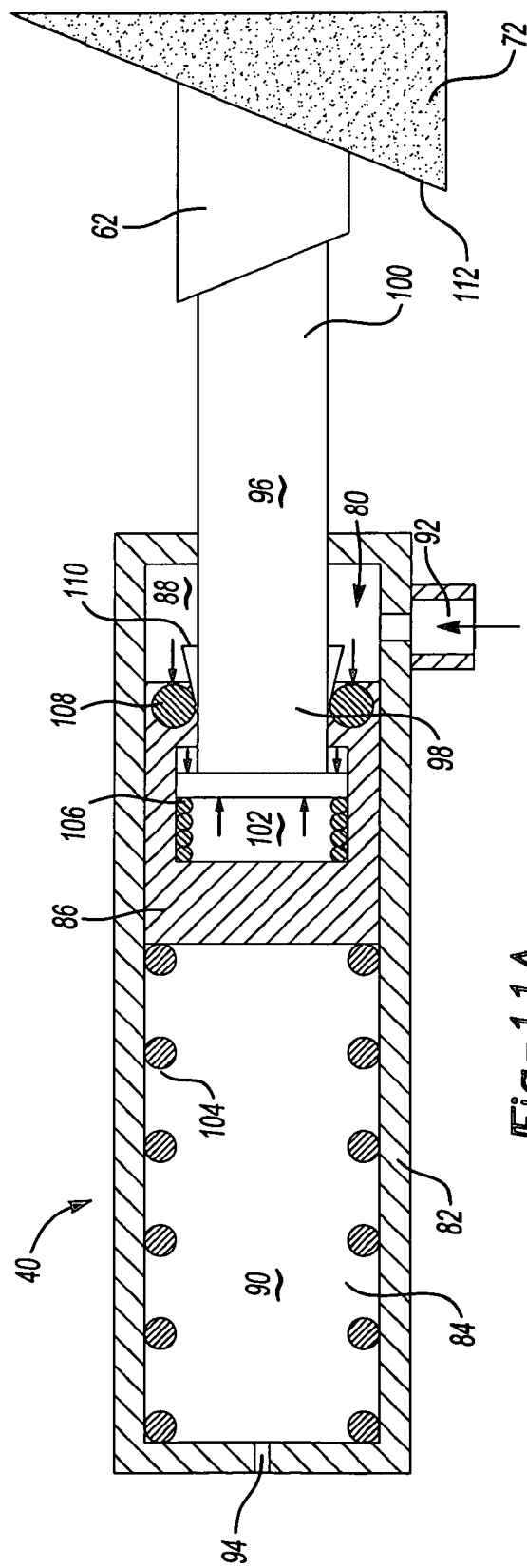
FIG. 11A shows the locking cylinder of FIG. 8 at the start of unlocking.
Figure 11B:
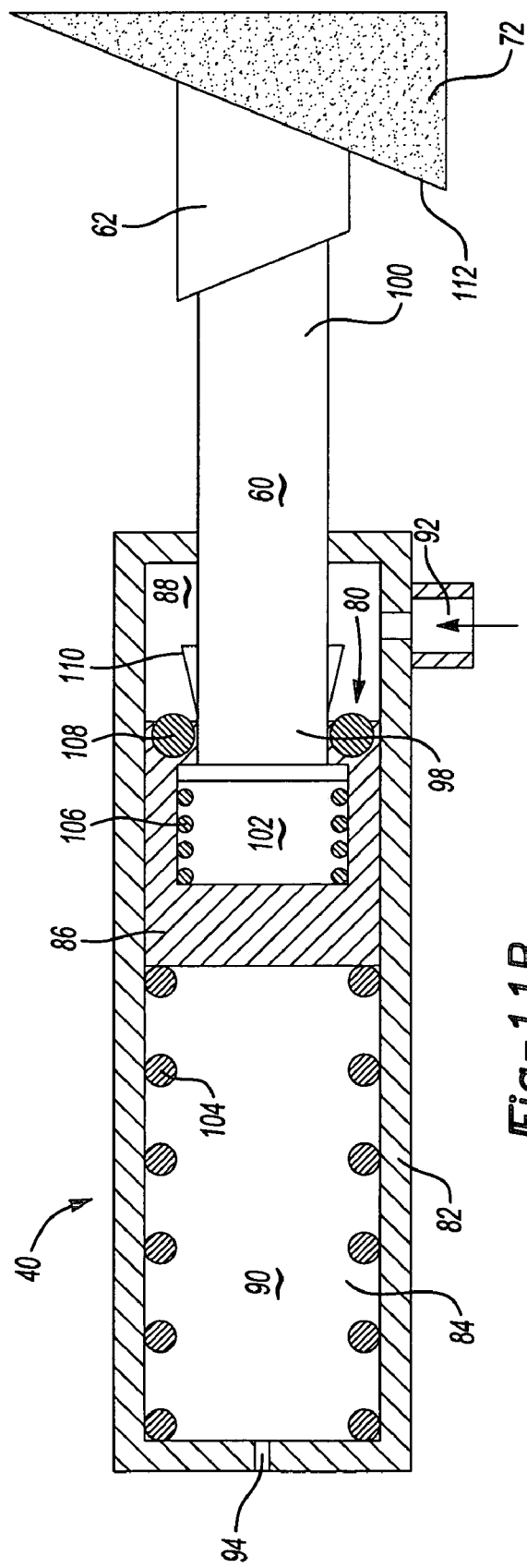
FIG. 11B shows the locking cylinder of FIG. 8 in a release and unlocked position.

In FIGS. 11A and 11B, the process is reversed to move the cylinder 40 to the unlocked position. With the force removed from the wedge member 62 by the additional application force supplied by the service brake system 14 against the brake operating member 74, the wedge member 62 can be easily retracted. The air cylinder 40 is re-pressurized via the air supply port 92. As air is re-introduced into the first chamber 88, the piston 86 is forced against the main resilient spring member 104. Air enters the inner cavity 102 and this creates a force, which in addition to that of the secondary resilient spring member 106, causes the balls 108 to be moved relative to the locking ramp surface 110. This is shown in FIG. 11A. As the balls 108 move, the locking force between the cylinder walls and the extension shaft 96 is removed and the cylinder 40 is returned to an unlocked position, as shown in FIG. 11B. Further movement of the piston 86 draws the extension shaft 96 into the cylinder housing 82, retracting the wedge member 62 away from the brake operating member 74. As long as the first chamber 88 is pressurized, the cylinder 40 remains in the retracted position, shown in FIG. 8.

The subject invention utilizes the parking brake system 16 to apply the wheel brakes 12 to generate the brake clamp force for parking and then subsequently mechanically latches the brakes 12 via pneumatic control to achieve a parked condition. The entire system is pneumatically operated. The pneumatically controlled air cylinder 40 moves the mechanical locking device.

The air cylinder 40 extends a variable amount until it contacts the rest position of the brake operating member 74. Without requiring further forward or rearward movement of the air cylinder extension shaft 96, the air cylinder 40 locks itself in that position. When air is reapplied to the cylinder 40 the process reverses. First the extension shaft 96 is unlocked, and then the shaft 96 and the wedge member 62 are retracted. As long as air is supplied to the cylinder 40, the extension shaft 96 remains retracted. When air pressure is removed, the main resilient spring member 104 of the cylinder 40 drives the shaft 96 and wedge member 62 to full extension and locks the shaft 96 into place once the wedge member 62 comes to the rest position against the brake operating member 74.

Figure 12:
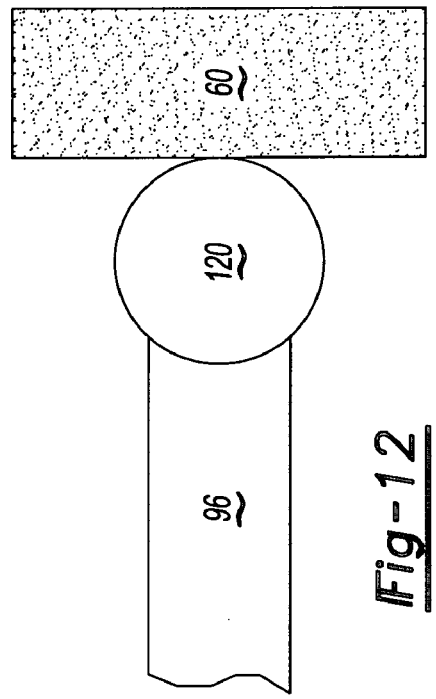
FIG. 12 schematically shows a locking component comprising a pin.

Optionally, instead of a wedge member 62, a pin 120 as shown in FIG. 12, could also be used. The pin 120 engages the brake member 60 to lock the brake 12 in an applied position for parking. In this configuration, the position that the brake 12 is locked in for parking remains fixed (as opposed to the wedge park position, which can vary). This configuration operates in the same manner as described above, but the internal or secondary locking mechanism 80 is not needed. The secondary locking mechanism 80 is preferred for the wedge member 62 because a force is generated that tends to drive the wedge member 62 from engagement with the brake member 60.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A parking brake system for a vehicle comprising:
   an air chamber for actuating a vehicle brake assembly;
   a pneumatic parking demand mechanism selectively actuated to mechanically apply a parking brake force to the vehicle brake assembly;
   an air connection line fluidly connecting said air chamber to a parking air reservoir;
   a valve assembly cooperating with said air connection line to selectively supply air to said air chamber from said parking air reservoir to apply the vehicle brake assembly in response to movement of said pneumatic parking demand mechanism; and
   an air cylinder having a locking component that locks the vehicle brake assembly in an applied condition wherein said locking component is pneumatically controlled in response to movement of said pneumatic parking demand mechanism and wherein said locking component has a primary locking mechanism and a secondary locking mechanism that cooperate to lock and hold the vehicle brake assembly in response to a parking demand.

2. The system of claim 1 wherein said pneumatic parking demand mechanism comprises a hand control cooperating with a pneumatic control valve and wherein said air connection line includes at least a first line portion fluidly connecting said pneumatic control valve to said valve assembly and a second line portion fluidly connecting said pneumatic control valve to said air cylinder.

3. The system of claim 2 wherein said second line portion is pressurized during non-parking conditions.

4. The system of claim 3 wherein said pneumatic control valve provides proportional control via said valve assembly to selectively pressurize said air chamber to apply the vehicle brake assembly to supplement service braking.

5. The system of claim 4 wherein said valve assembly includes a two-way valve fluidly connecting said air chamber with a service brake controller and an inversion valve fluidly connecting said two-way valve with said pneumatic control valve.

6. The system of claim 5 wherein pressure in said second line portion decreases and said inversion valve generates a positive pressure output to pressurize said air chamber via said two-way valve in response to a proportional control request generated by movement of said hand control.

7. The system of claim 5 wherein said inversion valve generates a positive pressure output to pressurize said air chamber via said two-way valve to apply the vehicle brake assembly and wherein pressure in said second line portion falls below a predetermined minimum pressure level causing said locking component to move to a locked position in response to said hand control being moved to a park position.

8. The system of claim 7 wherein said locking component remains in said locked position as pressure in said air chamber decreases over time.

9. The system of claim 5 wherein said inversion valve releases air from said air chamber and wherein pressure in said second line portion increases to move said locking component to an unlocked position in response to said hand control being moved to a release position.

10. The system of claim 9 including a pressure component positioned between said inversion valve and said pneumatic control valve wherein said pressure component is responsive to a predetermined pressure level to generate a control signal to apply and release the vehicle brake assembly via the service brake controller to release said locking component from a locked position under a predetermined condition.

11. The system of claim 1 wherein said locking component comprises a pin mounted to an extendable shaft with said air cylinder being pressurized to hold said pin and said extendable shaft in an unlocked position and said air cylinder being de-pressurized to extend said extendable shaft to a locked position where said pin engages a brake operating member.

12. The system of claim 1 wherein said air cylinder includes a cylinder housing and an extendable shaft movable relative to said cylinder housing and wherein said primary locking mechanism comprises a first lock component supported by one end of said extendable shaft, said first lock component being adapted for engagement with a brake operating member and wherein said secondary locking mechanism comprises a second lock component positioned within said cylinder housing for engagement with said extendable shaft.

13. The system of claim 1 wherein the air chamber is resiliently biased at a spring force to a non-applied position and wherein the parking brake system is adapted to cooperate with a service brake system having an electronic control unit that actuates the vehicle brake assembly by pressurizing the air chamber to overcome the spring force in response to service braking requests and with the parking brake system acting independently from the electronic control unit to actuate the vehicle brake assembly by pressurizing the air chamber via said valve assembly to overcome the spring force in response to parking braking requests.

14. A parking brake system for a vehicle comprising:
an air chamber for actuating a vehicle brake assembly;
a pneumatic parking demand mechanism selectively actuated to mechanically apply a parking brake force to the vehicle brake assembly;
an air connection line fluidly connecting said air chamber to a parking air reservoir;
a valve assembly cooperating with said air connection line to selectively supply air to said air chamber from said parking air reservoir to apply the vehicle brake assembly in response to movement of said pneumatic parking demand mechanism; and
an air cylinder having a locking component that locks the vehicle brake assembly in an applied condition wherein said locking component is pneumatically controlled in response to movement of said pneumatic parking demand mechanism and wherein said air cylinder comprises a cylinder housing defining an interior cavity and having an inlet port and a vent port, a piston slidably mounted within said cylinder housing and separating said interior cavity into at least first and second chambers, and an extension shaft operably coupled to said piston and wherein said locking component comprises a wedge portion formed at one end of said extension shaft for engaging a brake member and a secondary locking device enclosed within said interior cavity to hold said wedge portion in engagement with the brake member.

15. The system of claim 14 wherein said first chamber is pressurized via said inlet port to hold said piston and said extension shaft in an unlocked position.

16. The system of claim 15 including a resilient member operably coupled to said piston and enclosed within said second chamber wherein said resilient member moves said piston and said extension shaft toward the brake member when pressurized air is removed from said first chamber in response to said pneumatic parking demand mechanism being moved to a park position.

17. The system of claim 16 wherein said extension shaft is constrained from further movement once said wedge portion engages the brake member and wherein said resilient member moves said piston relative to said extension shaft to actuate said secondary locking device.

18. The system of claim 17 wherein said secondary locking device comprises a plurality of balls supported by said piston and a ramped surface formed on said extension shaft, said plurality of balls being forced into engagement with said ramped surface by said resilient member until said locking component achieves a locked position.

19. A method for pneumatically controlling a parking brake system for vehicle comprising the steps of:
a) initiating a parking brake request;
b) pressurizing an air chamber to move a wheel brake into an applied position in response to the parking brake request;
c) pneumatically actuating an air cylinder to mechanically lock the wheel brake in the applied position by decreasing air pressure supplied to the air cylinder below a predetermined pressure level; and
d) generating a parking release command, generating a signal when a predetermined pressure level is achieved subsequent to the parking release command, communicating the signal to a service brake electronic control unit, and applying and releasing the wheel brake in response to a command from the service brake electronic control unit such that the air cylinder does not become trapped in a locked position.

20. The method of claim 19 including the step of locking the wheel brake in the applied position with the air cylinder until a release command is initiated.

21. The method of claim 19 including the step of extending a locking component from the air cylinder to engage and hold a brake component in a locked position in response to the parking brake request.

22. The method of claim 19 including the step of pneumatically actuating the air cylinder in response to movement of a pneumatic parking demand mechanism.

23. The method of claim 19 wherein step (a) includes actuating a pneumatic parking demand mechanism to initiate the parking brake request wherein the pneumatic parking demand mechanism comprises a hand control cooperating with a pneumatic control valve; and providing proportional control with the pneumatic control valve to selectively pressurize the air chamber to apply the wheel brake to supplement service braking.

24. A parking brake system for a vehicle comprising:
an air chamber for actuating a vehicle brake assembly;
a pneumatic parking demand mechanism selectively actuated to mechanically apply a parking brake force to the vehicle brake assembly;
an air connection line fluidly connecting said air chamber to a parking air reservoir;
a valve assembly cooperating with said air connection line to selectively supply air to said air chamber from said parking air reservoir to apply the vehicle brake assembly in response to movement of said pneumatic parking demand mechanism;
an air cylinder having a locking component that locks the vehicle brake assembly in an applied condition wherein said locking component is pneumatically controlled in response to movement of said pneumatic parking demand mechanism; and
a pressure component for identifying a predetermined pressure level wherein in response to a parking release command from said pneumatic parking demand mechanism, said pressure component generates a signal at said predetermined pressure level that is communicated to a service brake electronic control unit which applies and releases the vehicle brake assembly such that the locking component does not become trapped in a locked position.

25. A method for pneumatically controlling a parking brake system for a vehicle comprising the steps of:

a) initiating a parking brake request;

b) pressurizing an air chamber to move a wheel brake into an applied position in response to the parking brake request;

c) pneumatically actuating an air cylinder to mechanically lock the wheel brake in the applied position by decreasing air pressure supplied to the air cylinder below a predetermined pressure level and including utilizing a primary locking mechanism and a secondary locking mechanism that cooperate to lock and hold the wheel brake in the applied position; and (d) providing the air cylinder with a cylinder housing and an extendable shaft that is movable relative to the cylinder housing, supporting a first lock component on one end of the extendable shaft to provide the primary locking mechanism, engaging a brake operating member of the wheel brake with the first lock component to lock and hold the wheel brake in the applied position, positioning a second lock component within the cylinder housing for engagement with the extendable shaft to provide the secondary locking mechanism, and engaging the extendable shaft with the second lock component to lock and hold the wheel brake in the applied position.

* * * * *